(12) United States Patent
Brown

(10) Patent No.: US 6,480,224 B1
(45) Date of Patent: Nov. 12, 2002

(54) MOBILE MULTIPLEXED SLOW SCAN VIDEO SYSTEM

(75) Inventor: Robert V. Brown, Leo, IN (US)

(73) Assignee: International Truck Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/384,673

(22) Filed: Aug. 27, 1999

(51) Int. Cl.[7] .................................................. H04N 7/00
(52) U.S. Cl. ...................................................... 348/118
(58) Field of Search ............................ 348/118, 42, 51, 348/148, 149; 701/36, 35, 118; 340/910, 431

(56) References Cited

U.S. PATENT DOCUMENTS 6,064,299 A * 5/2000 Lesesky et al. ............. 340/431
6,161,066 A * 12/2000 Wright et al. ................ 701/36
6,177,886 B1 * 1/2001 Billington et al. .......... 340/934
6,314,364 B1 * 11/2001 Nakamura ................... 701/200
6,320,612 B1 * 11/2001 Young ......................... 348/148

FOREIGN PATENT DOCUMENTS

JP          07264455          10/1995

* cited by examiner

*Primary Examiner*—Chris Kelley
*Assistant Examiner*—Behrooz Senfi
(74) *Attorney, Agent, or Firm*—Jeffrey P. Calfa; Neil T. Powell; Dennis Kelly Sullivan

(57) ABSTRACT

A mobile closed circuit television system in which a pre-existing data communication system in a vehicle is used as a medium for transmitting video data from an on-board television camera (12) to an on-board television monitor. The pre-existing data communication system has a data bus (10) that serves various electric and electronic devices throughout a vehicle, and is embodied in wiring modules, or wiring harnesses, that run throughout the vehicle. The pre-existing data bus utilizes an operating protocol embodied in a published standard that is recognized by the industry, SAE Standard J1939, published by the Society of Automotive Engineers, being the particular one utilized in practice of the present invention.

8 Claims, 1 Drawing Sheet ized by the industry. SAE Standard J1939, published
MOBILE MULTIPLEXED SLOW SCAN VIDEO SYSTEM

FIELD OF THE INVENTION

This invention relates to mobile vehicles that have closed circuit television systems comprising one or more video cameras for observing fields of view that may be inconvenient, or even impossible, for an occupant of a vehicle to see, either via direct line-of-sight or indirectly via a mirror, and one or more video monitors for displaying fields of view observed by such cameras.

BACKGROUND AND SUMMARY OF THE INVENTION

Certain mobile vehicles, such as trucks or motor homes for example, may have closed circuit television systems for enabling an occupant of the vehicle to observe fields of view in and/or around the vehicle. One example of such a closed circuit television system comprises a video television monitor having a screen disposed for viewing by an occupant of the vehicle, the driver of the vehicle for example. One or more video television cameras are situated to observe one or more fields of view that may be inconvenient, or even impossible, for the driver to see, either by direct line-of-sight viewing or indirect viewing via a mirror or mirrors. One video camera may observe a field of view to the rear of the vehicle; another camera may observe a field of view to a blind side of the vehicle, such as to the right rear in a vehicle where the driver sits on the left side toward the front of the vehicle. By suitable switching arrangements, the video cameras may be selectively switched to the single monitor. Alternatively, the vehicle may have a devoted monitor for each camera.

Regardless of the particular number of cameras and the particular number of monitors in a mobile vehicle, it is customary to connect a remote television camera to a television monitor by running coaxial cable within the vehicle. The cable carries video signals representing the field of view observed by the camera to the monitor.

It is believed that certain mobile closed circuit television systems can perform satisfactorily at slower frame rates than those commonly used in commercial broadcast television. Slower frame rates can reduce the frequency of data transmission, and hence reduce system bandwidth. Sufficient bandwidth reduction may enable video data to be transmitted satisfactorily by other than coaxial cable.

It is further believed that the connection of remote video cameras to video monitors by media other than coaxial cables could be useful in equipping certain vehicles with closed circuit television systems. For example, the availability of such a system may facilitate a Truck Equipment Manufacturer's installation of a system because coaxial cables do not have to fabricated to desired lengths and then routed within a vehicle.

The present invention relates to a mobile closed circuit television system in which a pre-existing data communication system in a vehicle is used as a medium for transmitting video data from an on-board television camera to an on-board television monitor. Such a pre-existing data communication system comprises a data bus that serves various electric and electronic devices throughout a vehicle. The data bus is embodied in wiring modules, or wiring harnesses, that run throughout the vehicle. Such wiring connects remote devices with electronic processors and allows electronic processors to communicate with each other. For example, data obtained from various sensors can be communicated to processors that process the data for control and/or informational purposes. The processors may issue appropriate commands to manage various systems of the vehicle, and/or may display information to the driver.

Such a pre-existing data bus may utilize an operating protocol that is embodied in a published standard that is recognized by the industry. SAE Standard J1939, published by the Society of Automotive Engineers, is an example of a standard that is being increasingly used in the manufacture of certain motor vehicles to define how data is to be communicated over a vehicle data bus, In accordance with certain principles of the invention, data from a frame captured by a television camera is processed by an electronic module that utilizes the operating protocol embodied in SAE Standard J1939. That processing converts the video data to a form that allows it to be transmitted over a data bus adhering to the SAE Standard. The data is then converted back to a form that can be used by a monitor to display the captured frame on the monitor screen. The rate at which captured frames are presented on the monitor screen is slower than that typically used in commercial broadcast television, but this slower rate may be quite suitable for various applications of closed circuit television to a mobile vehicle. And it makes use of pre-existing wiring in a vehicle for data transmission, rather than requiring installation of coaxial cable.

Accordingly a general aspect of the within claimed invention relates to a mobile vehicle comprising: a closed circuit television system; an electronic data link through which various devices in the vehicle communicate according to a defined data transmission protocol for the vehicle; the closed circuit television system comprising a television camera for observing a field of view and providing signals representing the field of view; a monitor for presenting an image of the field of view; and a processing system for processing the signals from the television camera into signals for the monitor, the processing system comprising a processor that processes the signals from the television camera to create signals defining video frames corresponding to fields of view observed by the video camera at various times and conforming to the defined data transmission protocol for the vehicle and that places the created signals on the electronic data link for transmission to the monitor.

Another general aspect of the within claimed invention relates to a method of equipping a mobile vehicle with a closed circuit television system, the method comprising: providing a vehicle that has a pre-existing electronic data link through which various devices in the vehicle communicate according to a defined data transmission protocol for the vehicle; installing in the vehicle a closed circuit television system comprising a television camera for observing a field of view and a television monitor for presenting an image of the field of view; processing signals from the camera that represent an image frame of the field of view observed by the camera to create signals conforming to the defined data transmission protocol for the vehicle; and placing the created signals on the electronic data link for transmission to the monitor.

The foregoing, along with further features and advantages, of the invention, will be seen in the following disclosure of a presently preferred embodiment of the invention depicting the best mode contemplated at this time for carrying out the invention. The disclosure includes drawings, briefly described as follows.

DESCRIPTION OF THE PREFERRED EMBODIMENT

Figure 1:
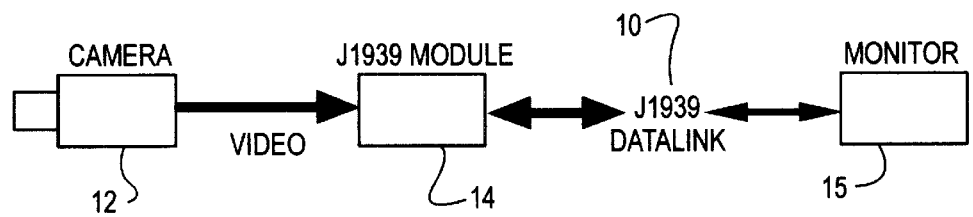
FIG. 1 is a general block diagram of a system according to the present invention.

FIG. 1 shows general principles of the present invention applied to a mobile vehicle that has a preexisting data communication system. The preexisting data communication system comprises a data bus, or data link, 10 that serves various electric and electronic devices pre-existing throughout the vehicle. The data bus is embodied in wiring modules, or wiring harnesses, that run throughout the vehicle. Such wiring connects remote devices in the vehicle with electronic processors and allows electronic processors in the vehicle to communicate with each other. For example, data obtained from various sensors can be communicated to processors that process the data for control andlor informational purposes. The processors may issue appropriate commands to manage various systems of the vehicle, and/or may display information to the driver.

The pre-existing data bus utilizes an operating protocol that is embodied in a published standard recognized by the industry. SAE Standard J1939, published by the Society of Automotive Engineers, is an example of a standard that is being increasingly used in the manufacture of certain motor vehicles to define how data is to be communicated over a vehicle data bus, and it is the protocol embodied in that standard that is utilized in the preferred practice of the present invention.

A television camera 12 is situated at a suitable location in the mobile vehicle for observing a desired field of view. Camera 12 provides signals representing the field of view. Those signals are supplied to a module 14 that comprises a processor for processing them. Module 14 creates signals defining video frames corresponding to fields of view observed from time to time by camera 12. The created signals conform to the defined data transmission protocol of SAE Standard J1939. Module 14 that places the created signals on the electronic data link so they can be transmitted to a television monitor 15 in accordance with the protocol.

Figure 2:
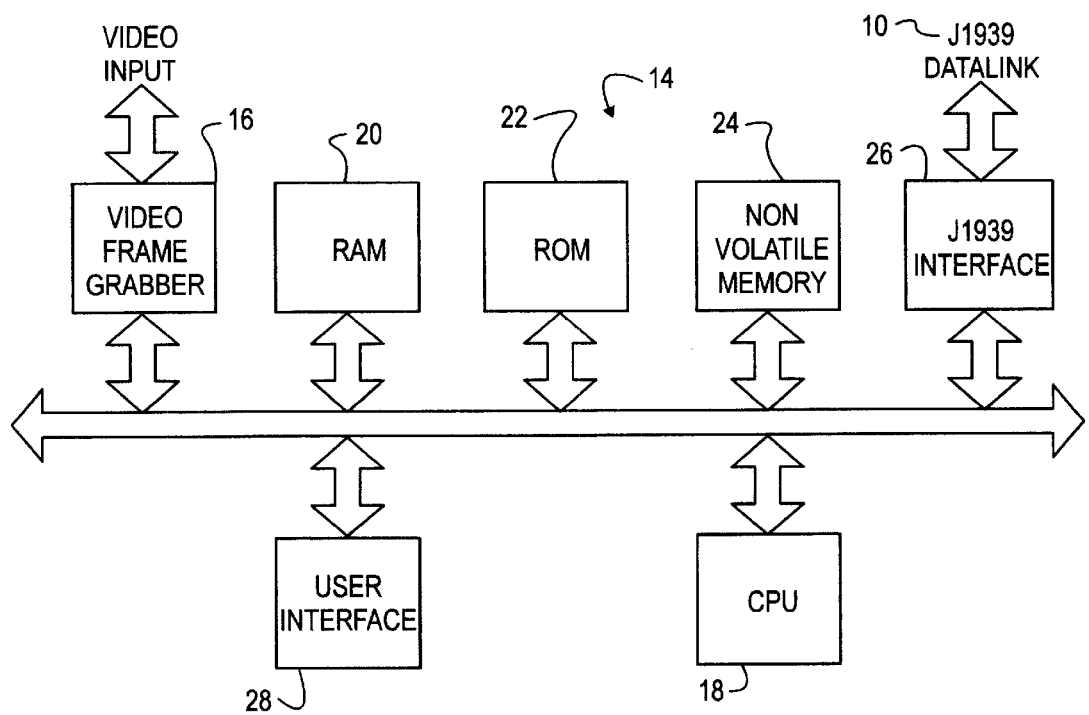
FIG. 2 is a more detailed block diagram.

FIG. 2 shows further detail relevant to the inventive principles. Module 14 comprises a video frame grabber 16 that from time-to-time electronically captures frames each of which corresponds to the field of view seen by camera 12 at a particular time. Module 14 further comprises a central processing unit (CPU), i.e. a processor, 18, and associated random access memory (RAM) 20, read only memory (ROM) 22, and non-volatile memory 24, that operate to process the signals from the camera corresponding to each captured frame. The processing converts each captured frame into processed data that conforms to the protocol of SAE Standard J1939. The processed data representing a frame is made available through a J1939 interface 26 to data bus 10, enabling the frame to be transmitted to monitor 15. The transmitted data is then converted back to a form suitable for causing monitor to display an image corresponding to the captured frame on the monitor screen.

The processing system also includes a user interface 28 that allows certain characteristics of the captured frames to be modified for creating desired characteristics in the appearance of the frames on a screen of the monitor. For example, image contrast and content can be electronically enhanced via the user interface.

The rate at which captured frames are presented on the monitor screen is slower than that typically used in commercial broadcast television, but this slower rate may nonetheless be acceptable for certain purposes of closed circuit televisions in a mobile vehicle. By using the preexisting data link for television data communication from the camera to the monitor, installation of coaxial cable to connect the camera to the monitor is unnecessary.

While a presently preferred embodiment of the invention has been illustrated and is described, it should be appreciated that principles of the invention are applicable to all embodiments that fall within the scope of the following claims.

What is claimed is:

1. A mobile vehicle comprising: a closed circuit television system; an electronic data link through which various devices in the vehicle communicate according to a defined data transmission protocol for the vehicle; the closed circuit television system comprising a television camera for observing a field of view and providing signals representing the field of view; a television monitor for presenting an image of the field of view; and a processing system for processing the signals from the television camera into signals for the monitor, the processing system comprising a processor that processes the signals from the television camera to create data signals defining video frames corresponding to fields of view observed from time to time by the video camera and conforming to the defined data transmission protocol for the vehicle and that places the created signals on the electronic data link for transmission to the monitor.

2. A mobile vehicle as set forth in claim 1 in which the processing system comprises a user interface for enabling a user to modify certain characteristics of the captured frames for creating desired characteristics in the appearance of the frames on a screen of the monitor.

3. The improvement set forth in claim 1 in which the electronic data link through which various devices in the vehicle communicate according to a defined data transmission protocol for the vehicle utilizes SAE Standard J1939 as the protocol.

4. A method of equipping a mobile vehicle with a closed circuit television system, the method comprising: providing a vehicle that has a pre-existing electronic data link through which various devices in the vehicle communicate according to a defined data transmission protocol for the vehicle; installing in the vehicle a closed circuit television system comprising a television camera for observing a field of view and a television monitor for presenting an image of the field of view; processing signals from the camera that represent an image frame of the field of view observed by the camera to create data signals conforming to the defined data transmission protocol for the vehicle; and placing the created signals on the electronic data link for transmission to the monitor.

5. A method as set forth in claim 4 including modifying, by a user interface of the processing system, certain characteristics of the captured frames for creating desired characteristics in the appearance of the frames on a screen of the monitor.

6. A method as set forth in claim 4 in which the step of processing signals from the camera that represent an image frame of the field of view observed by the camera to create data signals conforming to the defined data transmission protocol for the vehicle comprises processing the signals from the camera to create data signals conforming to the protocol of SAE Standard J1939.

7. A mobile vehicle as set forth in claim 1 in which the electronic data link through which various devices in the vehicle communicate according to a defined data transmission protocol for the vehicle comprises an electronic data link utilizing a protocol conforming to a Society of Automotive Engineers standard.

8. A method as set forth in claim 4 in which the step of processing signals from the camera that represent an image frame of the field of view observed by the camera to create data signals conforming to the defined data transmission protocol for the vehicle comprises processing the signals from the camera to create data signals conforming to a protocol of a Society of Automotive Engineers standard.

* * * * *